United States Patent
Henrich et al.

(10) Patent No.: US 9,568,130 B2
(45) Date of Patent: Feb. 14, 2017

(54) PROFILED CLAMP WITH SEALING ELEMENT

(71) Applicant: NORMA GERMANY GMBH, Maintal (DE)

(72) Inventors: Detlef Henrich, Limeshain (DE); Mathias Krauss, Nidderau (DE); Manfred Krueger, Buedingen (DE)

(73) Assignee: NORMA GERMANY GMBH, Maintal (DE)

( * ) Notice: Subject to any disclaimer, the term of this patent is extended or adjusted under 35 U.S.C. 154(b) by 229 days.

(21) Appl. No.: 13/656,010

(22) Filed: Oct. 19, 2012

(65) Prior Publication Data

US 2013/0097815 A1 Apr. 25, 2013

(30) Foreign Application Priority Data

Oct. 22, 2011 (DE) .......................... 10 2011 116 768

(51) Int. Cl.
| | | |
|---|---|---|
| *F16L 23/00* | (2006.01) | |
| *F16L 23/08* | (2006.01) | |
| *F16L 23/20* | (2006.01) | |

(52) U.S. Cl.
CPC ............... *F16L 23/08* (2013.01); *F16L 23/20* (2013.01); *Y10T 24/1443* (2015.01)

(58) Field of Classification Search
CPC .......... F16L 23/08; F16L 23/04; F16L 17/025; F16L 23/18
USPC ............. 24/279, 19, 280, 287, 285; 285/367
See application file for complete search history.

(56) References Cited

U.S. PATENT DOCUMENTS

| | | | | |
|---|---|---|---|---|
| 2,761,707 | A * | 9/1956 | Herman | 285/367 |
| 3,029,095 | A * | 4/1962 | King | F16L 23/10 24/279 |
| 3,099,060 | A * | 7/1963 | Smith | F16L 23/10 24/279 |
| 3,144,264 | A * | 8/1964 | Lewis | F16L 23/08 285/367 |
| 3,635,506 | A * | 1/1972 | Womble et al. | 285/411 |
| 3,794,360 | A * | 2/1974 | Bachle | B01D 63/06 285/148.13 |
| 3,865,413 | A * | 2/1975 | Mizusawa et al. | 285/367 |
| 4,693,502 | A * | 9/1987 | Oetiker | 285/334.5 |
| 4,739,542 | A * | 4/1988 | Krzesicki | 24/285 |
| 5,815,892 | A | 10/1998 | Geppert | |

(Continued)

FOREIGN PATENT DOCUMENTS

| | | | |
|---|---|---|---|
| DE | 4108852 | A1 * | 9/1992 |
| DE | 102004009808 | A1 * | 9/2005 |

(Continued)

OTHER PUBLICATIONS

FR 2906864 Machine Translation.*

(Continued)

*Primary Examiner* — Victor Batson
*Assistant Examiner* — Jason W San
(74) *Attorney, Agent, or Firm* — Greenblum & Bernstein, P.L.C.

(57) ABSTRACT

Profiled clamp that includes a clamping element, a sealing element having elastically deformable spacers on a radial outside, and a profile band on which the sealing element is held secured against loss. The elastically deformable spacers bear against an inside of the profile band in a non-positive manner.

19 Claims, 1 Drawing Sheet

(56) References Cited

U.S. PATENT DOCUMENTS

| | | | |
|---|---|---|---|
| 6,052,873 A * | 4/2000 | Cuno | 24/20 R |
| 6,305,054 B1 * | 10/2001 | Imes et al. | 24/276 |
| 6,523,866 B2 * | 2/2003 | Lin | 285/410 |
| 7,249,790 B2 * | 7/2007 | Potts et al. | 285/420 |
| 7,399,005 B2 * | 7/2008 | Rigollet et al. | 285/407 |
| 7,717,479 B2 * | 5/2010 | Lebo et al. | 285/420 |
| 7,946,001 B2 * | 5/2011 | Krauss | 24/19 |
| 8,136,847 B2 * | 3/2012 | Madara et al. | 285/367 |
| 8,196,971 B2 * | 6/2012 | Hansen | 285/367 |
| 8,245,361 B2 * | 8/2012 | Bouchiat et al. | 24/279 |
| 8,632,105 B2 * | 1/2014 | Krueger | 285/420 |
| 8,777,277 B2 * | 7/2014 | Dole et al. | 285/367 |
| 2003/0062718 A1 * | 4/2003 | Radzik | 285/94 |
| 2003/0122377 A1 * | 7/2003 | Northrop et al. | 285/363 |
| 2004/0046390 A1 * | 3/2004 | Mosse et al. | 285/363 |
| 2004/0075276 A1 * | 4/2004 | Lemke et al. | 285/367 |
| 2004/0262922 A1 | 12/2004 | Andersson | |
| 2005/0017510 A1 | 1/2005 | Rigollet et al. | |
| 2005/0242585 A1 * | 11/2005 | Dole et al. | 285/367 |
| 2006/0202480 A1 * | 9/2006 | Cassel et al. | 285/408 |
| 2008/0136117 A1 * | 6/2008 | Roe et al. | 277/530 |
| 2008/0272595 A1 * | 11/2008 | Gibb et al. | 285/337 |
| 2011/0037250 A1 * | 2/2011 | Bowman et al. | 285/110 |
| 2011/0127770 A1 * | 6/2011 | Kimura et al. | 285/339 |
| 2013/0127162 A1 * | 5/2013 | Fritskey et al. | 285/407 |
| 2013/0207389 A1 * | 8/2013 | Rigollet | 285/407 |
| 2013/0257046 A1 * | 10/2013 | Henrich et al. | 285/407 |
| 2014/0117665 A1 * | 5/2014 | Cumic et al. | 285/367 |
| 2016/0053783 A1 * | 2/2016 | Koehler | F16L 23/08 24/484 |

FOREIGN PATENT DOCUMENTS

| | | | |
|---|---|---|---|
| DE | 602 10 142 | | 3/2007 |
| DE | 102012009256 | * | 11/2013 |
| EP | 1930643 A1 | * | 6/2008 |
| EP | 2 284 423 | | 2/2011 |
| FR | 2 906 864 | | 4/2008 |
| FR | 2906864 A1 | * | 4/2008 |
| FR | 2963404 A1 | * | 2/2012 |
| FR | 2974613 A1 | * | 11/2012 |
| JP | 04-231787 | | 8/1992 |
| JP | 05033890 A | * | 2/1993 |
| JP | 2007-339513 | | 7/2009 |
| JP | 4744640 B1 | * | 8/2011 |
| KR | 10-2005-0044634 | | 5/2005 |
| WO | 2005/001323 | | 1/2005 |

OTHER PUBLICATIONS

German Office Action conducted in counterpart German Appln. No. 10 2011 116 768.8 (Oct. 14, 2013).

European Search Report/Office Action conducted in counterpart European Appln. No. 12006114.8-2424 (Jan. 22, 2013) (with partial English language translation).

Japanese Office Action conducted in counterpart Japan Appln. No. 2012-230602 (Jul. 1, 2014) (w/ English language translation).

Chinese Office action conducted in counterpart Chinese Appln. No. 2012110398073.1 (Apr. 24, 2014) (w/ English language translation).

Korea Office Action conducted in counterpart Korea Appln. No. 10-2012-116083 (Oct. 2, 2014)(w/ English language translation).

China Office Action conducted in counterpart China Appln. No. 201210398073.1 (Dec. 8, 2014)(w/ English language translation).

Japanese Office Action conducted in counterpart Japan Appln. No. 2012-230602 (Dec. 3, 2013) (with English language translation).

* cited by examiner

PROFILED CLAMP WITH SEALING ELEMENT

CROSS-REFERENCE TO RELATED APPLICATIONS

The present application claims priority under 35 U.S.C. §119 of German Patent Application No. 10 2011 116 768.8 dated Oct. 22, 2011, the disclosure of which is expressly incorporated by reference herein in its entirety.

BACKGROUND OF THE INVENTION

1. Field of the Invention

The invention relates to a profiled clamp with a clamping element and a profile band on which a sealing element is held secured against loss.

2. Discussion of Background Information

Profiled clamps of the above-described type are used, for example, for the fluid-tight connection of two pipe ends, which have a radially outwardly directed connecting flange. The profiled clamp is then placed onto this flange, so that axial and radial holding forces can be applied by tightening the profiled clamp. A cross section of the profile band is generally embodied or formed in a V-shaped or U-shaped manner for this purpose.

In order to achieve a fluid-tight connection, a sealing element, which has to be positioned axially between the connecting flanges of the pipe ends, is often used. If the sealing element is not attached to the profile clamp, at least two independent components, i.e., the profiled clamp and the sealing element, must be handled, with the result that the installation of the profiled clamp is relatively complicated. The fitter then has to correctly position the sealing element as well as the profiled clamp with respect to the pipes.

It is therefore known, e.g., from DE 602 10 142 T2 to connect the sealing element, which is embodied or formed as an annular disk, with the aid of deformable fixing clamps to the profile band in a positive manner. The fixing clamps can thereby be embodied or formed in one piece with the sealing element. The disclosure of DE 602 10 142 T2 is expressly incorporated by reference herein in its entirety.

A holding construction of this type is relatively complex. As a rule, a special tool is necessary for this purpose.

SUMMARY OF THE INVENTION

Embodiments of invention are directed to an attachment secured against loss of the sealing element to the profile band, which attachment is designed in a simple manner.

According to the invention, a profiled clamp of the type mentioned at the outset has a sealing element with elastically deformable spacers distributed over a circumference that bear against a radial inside of the profile band in a non-positive manner. The non-positive bearing is achieved, for example, in that the spacers bear against the inside with a preload. At least two spacers should be provided that are arranged on the circumference of the sealing element, that is, on a radial outside of the sealing element. In the case of a non-positive holding, the holding force can be adjusted relatively exactly. In this manner, it is possible to select the holding force such that the sealing element can be inserted into the profiled clamp without tools. Therefore, an adequate deformation of the spacers can be achieved manually. At the same time, the force applied by the elastic deformation of the spacers or the preloading thereof is then sufficiently large to hold the sealing element securely in the profiled clamp. Since a positive connection can be omitted, a secure connection of simple design thus results between the sealing element and the profile band.

Preferably, the spacers have a fixed end, with which they are connected to the sealing element, a contact region, with which they bear against the inside of the profile band, and a free end. The free end is radially moveable by an elastic deformation of the spacer with respect to the sealing element. This represents a relatively simple embodiment in order to achieve the necessary elasticity of the spacers that must follow the diameter reduction occurring during tightening of the profiled clamp.

Preferably, the sealing element is embodied or formed as a metal seal. A seal of this type is resistant to many chemicals. At the same time, it is relatively elastic, so that a sufficient sealing effect can be achieved.

Preferably, the spacers are embodied or formed in one piece with the sealing element. The danger of the spacers being accidentally detached from the sealing element is thus kept very low. At the same time the production expenditure is kept low, since the spacers can be produced simply at the same time as the sealing element. An additional connecting step can then be omitted.

In a preferred embodiment, the spacers extend parallel to the circumferential direction. The spacers are thus oriented in the circumferential direction, which means that a longitudinal extension of the spacers runs parallel to the circumferential direction. The ends of the spacers are then spaced apart at the same axial position but in the circumferential direction and in the radial direction. In this way, the contact region can be arranged furthest radially outwards, which means that the free end is curved inwards. The spacers can, e.g., be curved and formed of a metal. The curving results in relatively round edges, which make it possible for the spacers to slide in the circumferential direction on the inside of the profile band, so that the additional friction that has to be overcome when tightening the profiled clamp can be kept low.

Preferably, the free end is rolled-in in such a manner that a bend axis is parallel to the circumferential direction. Naturally, the bend axis does not need to be strictly parallel but as a rule will run in a straight line. A relatively good elasticity of the spacers is obtained by the rolling-in of the free end. At the same time, a rounded contact region results and thus a relatively smooth and flat seat on the inside of the profile band is achieved. The loading of the inner band is thus kept low.

Preferably, radial projections are embodied or formed on the inside of the profile band. The projections thereby project radially inwards and are formed, for example, by beads that are pressed into the profile band. A loose radial pre-positioning of the sealing element inside the profiled clamp is achieved by these projections. A twisting of the sealing element inside the profiled clamp is thus prevented.

Preferably, the profile band has two clamping heads with which the clamping element interacts. The clamping element is embodied or formed, for example, as a tightening screw, which is guided through openings in the clamping heads. Relatively high clamping forces can be applied thereby.

Embodiments of the invention are directed to a profiled clamp. The profiled clamp includes a clamping element, a sealing element having elastically deformable spacers on a radial outside, and a profile band on which the sealing element is held secured against loss. The elastically deformable spacers bear against an inside of the profile band in a non-positive manner.

According to embodiments, the spacers may include a fixed end connected to the sealing element, a contact region structured and arranged to bear against the inside of the profile band, and a free end.

In accordance with other embodiments of the invention, the sealing element can include a metal seal.

According to still other embodiments, the spacers can be formed in one piece with the sealing element.

According to other embodiments of the instant invention, the spacers can be extendible parallel to a circumferential direction.

Further, the free end can be rolled inwardly with a bend axis parallel to the circumferential direction.

In embodiments, the profile band may include radial projections formed on the inside.

Further, the profile band can have two clamping heads with which the clamping element interacts.

Moreover, the profile band can include two profile walls. At least one joint may be formed in each of the profile walls. The profile walls can be arranged to form one of a U- or V-shaped channel. Still further, the profiled walls may be arranged so that, as the clamping element is tightened pipe ends to be connected are pressed against opposite sides of the sealing element.

In further embodiments, a cross-section of the sealing element may include steps.

Embodiments of the instant invention are directed to a profiled clamp that includes a profile band having a radially inwardly opening channel, a sealing element having a plurality of spacers form on an outer radial surface, the plurality of spacers being elastically deformable to bear against an inside of the channel, and at least one radial projection formed in the channel that is structured and arranged for positioning the sealing element.

According to embodiments, the spacers can include a fixed end connected to the sealing element and a free end.

In accordance with other embodiments, the sealing element may include a metallic seal.

In still other embodiments, the spacers may be formed to extend in a circumferential direction.

According to other embodiments, the free end can be rolled-up around an axis parallel to a tangent to the outer radial surface.

In accordance with still yet other embodiments of the present invention, a cross-section of the sealing element may include steps radially inside of plurality of spacers.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
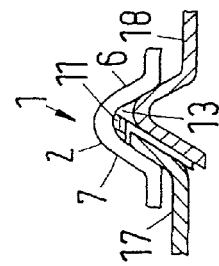
FIG. 1 illustrates a profiled clamp in the non-tensioned state.

FIG. 1 shows a profiled clamp 1 in a non-tensioned state. The profiled clamp 1 has a profile band 2, which has respectively a clamping head 3, 4 on its ends lying opposite one another. The clamping heads 3, 4 are connected to one another via a clamping element 5, which is embodied or formed as a tightening screw. By screwing in the tightening screw 5, a diameter of the profiled clamp 1 is reduced to thus generate a clamping force.

The profile band 2 has an essentially V-shaped cross section formed by two profile walls 6, 7. In the profile walls 6, 7, respective openings 8, 9 lying opposite one another are embodied or formed. Through use of these openings 8, 9, joints by adhesive force are formed in the profile band 2. These joints render possible a simple widening or tightening of the profiled clamp 1.

Radially inside the profiled clamp 1, a sealing element 10, shown by shading, is arranged, which is embodied or formed in an annular manner. The sealing element 10 has deformable spacers 11a, 11b, 11c, 11d, which are arranged on a radial outside 12 of the sealing element 10. In this manner, the spacers 11a through 11d under a preloading bear in a non-positive manner against a radial inside 13 of the profile band 2.

Projections 14a, 14b projecting radially inwards are embodied or formed in the form of beads on the radial inside 13 of the profile band 2. The spacers 11b, 11c bear in the circumferential direction against the projections 14a, 14b, so that a pre-positioning in the circumferential direction takes place.

Figure 2:
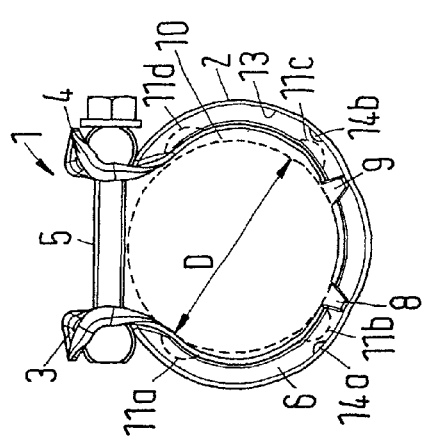
FIG. 2 illustrates the profiled clamp in the tensioned state.

FIG. 2 shows the profiled clamp 1 in the tensioned state. The tensioning screw 5 has been screwed in completely so that the clamping heads 3, 4 bear against one another. A free outer diameter D of the sealing element has now been accommodated inside the profile band 2. As a result, the spacers 11a through 11d have been deformed accordingly.

Figure 3:
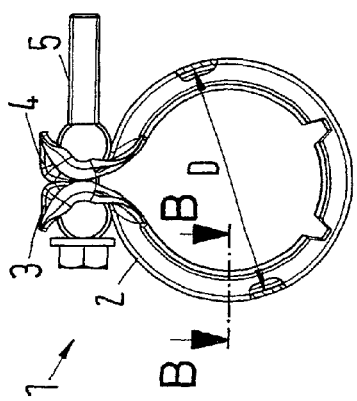
FIG. 3 illustrates the profiled clamp in cross section.

FIG. 3 now shows a cross section of the profiled clamp 1 according to FIG. 2. The sealing element 10 is arranged between the profile walls 6, 7 of the profile band 2 and bears with its radial outside 12 against the inside 13 of the profile band. The spacers 11a, 11b are deformed so that they bear smoothly against the radial outside 12 and against the inside 13 of the profile band. In the tensioned state of the profiled clamp 1, the spacers 11a through 11d thus need space only according to their material thickness. However, this additional installation space requirement is negligible.

Figure 4:
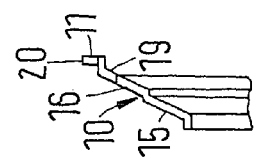
FIG. 4 illustrates a side view of a placed profile clamp.

The sealing element 10 has several steps 15, 16. By way of these steps during the connection of the profiled clamp 1 with pipe ends 17, 18 (FIG. 4), a tension is applied that increases the tightness.

During the assembly of the profiled clamp 1 on the pipe ends 17, 18, not only does an elastic deformation of the spacers 11*a* through 11*d* take place, but also a deformation of the sealing element 10. Then an axial and radial holding force is exerted on the pipe ends 17, 18 by the profiled clamp 1, due to the design of the profile band 2.

Figure 5:
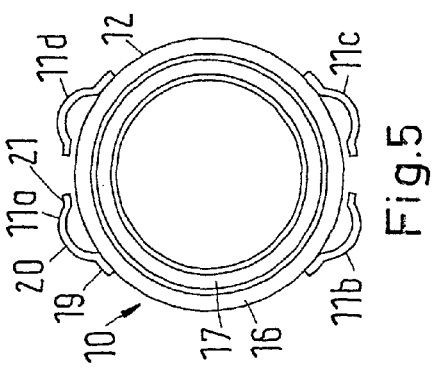
FIG. 5 illustrates a sealing element of a first embodiment.

In FIG. 5, the sealing element 10 is shown in a first embodiment. The sealing element 10 is provided with a total of four deformable spacers 11*a* through 11*d*, which are arranged on the outside 12 of the sealing element. The spacers 11*a* through 11*d* can be embodied or formed in a one-piece manner with the sealing element 10, but can also be soldered on or welded on, for example. The spacers 11*a* through 11*d* respectively have a fixed end 19, a contact region 20 and a free end 21. In this way, the spacers 11*a* through 11*d* extend parallel to the circumference of the sealing element 10. The fixed end 19 and the free end 21 can thus be located at the same axial level. The axial extension of the sealing element 10 is therefore not necessarily increased by the spacers 11*a* through 11*d*. Nevertheless, the spacers 11*a* through 11*d* can be embodied or formed with a relatively large longitudinal extension. In this manner, a high elasticity is obtained. Since the free end 21 firstly is spaced apart from the outside 12, a first deformation of the spacer 11*a* through 11*d* takes place with relatively low forces, until the free end 21 bears against the outside 12 of the sealing element. In a further deformation of the spacers 11*a* through 11*d*, as occurs during tightening of the profiled clamp 1, somewhat higher forces are necessary, since the free end 21 then slides on the outside 12 and the spacer 11*a* through 11*d* has to be deformed on both sides of the contact region 20. The necessary deformation forces therefore increase. It is thereby possible to insert the sealing element 10 with relatively low use of force into the profiled clamp 1 and nevertheless to achieve a secure hold of the sealing element in the profiled clamp 1.

Figure 6:
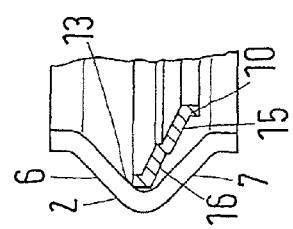
FIG. 6 illustrates a cross section of the sealing element according to FIG. 5.

FIG. 6 shows a cross section of the sealing element 10 according to FIG. 5.

Figure 7:
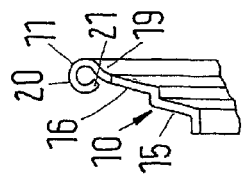
FIG. 7 illustrates a cross section of a sealing element of a second embodiment.

FIG. 7 shows a further embodiment of the sealing element 10, in which the spacer 11 is not directed in the circumferential direction, but has a rolled-in free end 21. A spacer 11 with sufficient elasticity is also achieved in an embodiment of this type, through which simultaneously sufficient pre-loading forces can be applied, so that the sealing element 10 can be held in a non-positive manner in the profiled clamp 1 or the profile band 2.

The profiled clamp or the profile band is generally produced from a metallic material. The sealing element can likewise have a metal. Through the non-positive holding of the sealing element 10 in the profile band 2 with the aid of the elastically deformable spacers 11, which start from a radial outside 12 of the sealing element 10 and bear against a radial inside 13 of the profile band 2, a secure retention of the sealing element 10 is achieved even in the non-tensioned state of the profiled clamp 1, without a positive connection being necessary. This connection is therefore very easy to produce and to use. Due to the preloading of the spacers and the optional radial projections on the inside of the profile band, a twisting of the sealing element before the final assembly is ruled out. Until the final assembly of the profiled clamp with the sealing element to pipe ends or corresponding flanges, the moment between the profiled clamp and the sealing element does not become so great that a slight twisting between the sealing element and the profile band can occur. A perfect alignment and placement of sealing element and profiled clamp with respect to one another is thereby secured. At the same time, optimal sealing properties are achieved. The sealing element can thereby be connected to the profiled clamp without special tools.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A profiled clamp comprising:
a clamping element;
a sealing element having elastically deformable spacers spaced around a circumference on a radial outside of the sealing element; and
a profile band on which the sealing element is held secured against loss,
wherein the elastically deformable spacers bear against an inside of the profile band in a pre-loaded manner,
wherein each spacer comprises, in a circumferential direction of the sealing device: a fixed end connected to the sealing element, followed by a contact region structured and arranged to bear against the inside of the profile band, followed by a free end, and
wherein the contact region is arranged furthest radially outwards in a non-tensioned state of the profile clamp.

2. The profiled clamp according to claim 1, wherein the sealing element comprises a metal seal.

3. The profiled clamp according to claim 1, wherein the spacers are formed in one piece with the sealing element.

4. The profiled clamp according to claim 1, wherein the spacers are extendible in a circumferential direction of the sealing element.

5. The profiled clamp according to claim 1, wherein the free end is rolled radially inwardly.

6. The profiled clamp according to claim 1, the profile band comprises radial projections formed on the inside.

7. The profiled clamp according to claim 1, wherein the profile band has two clamping heads with which the clamping element interacts.

8. The profiled clamp according to claim 1, wherein the profile band comprises two profile walls.

9. The profiled clamp according to claim 8, wherein at least one joint is formed in each of the profile walls.

10. The profiled clamp according to claim 8, wherein the profile walls are arranged to form one of a U- or V-shaped channel.

11. The profiled clamp according to claim 8, wherein the profiled walls are arranged so that, as the clamping element is tightened, pipe ends to be connected are pressed against opposite sides of the sealing element.

12. The profiled clamp according to claim 1, wherein a cross-section of the sealing element comprises steps.

13. A profiled clamp comprising:
a clamping element;
a profile band having a radially inwardly opening channel;

a sealing element having a plurality of spacers formed on an outer radial surface and spaced around a circumference, the plurality of spacers being elastically deformable to bear against an inside of the channel; and at least one radial projection formed in the channel that is structured and arranged for positioning the sealing element, wherein each spacer comprises, in a circumferential direction of the sealing element, a fixed end connected to the sealing element, followed by a contact region structured and arranged to bear against the inside of the profile band, followed by a free end, and wherein the contact region is arranged furthest radially outwards in a non-tensioned state of the profiled clamp.

14. The profiled clamp according to claim 13, wherein the sealing element comprises a metallic seal.

15. The profiled clamp according to claim 13, wherein the spacers are formed to extend in a circumferential direction.

16. The profiled clamp according to claim 13, wherein the free end is rolled-up around an axis parallel to a tangent to the outer radial surface.

17. The profiled clamp according to claim 13, wherein a cross-section of the sealing element comprises steps radially inside of the plurality of spacers.

18. The profiled clamp according to claim 6, wherein the spacers are structured and arranged to interact with the radial projections to secure the sealing element against loss from the profile band when the clamp is in a non-tensioned state.

19. The profiled clamp according to claim 13, wherein the spacers are structured and arranged to interact with the at least one radial projection to secure the sealing element against loss from the profile band when the clamp is in a non-tensioned state.

* * * * *